Oct. 10, 1961 T. E. BELSHAW 3,003,439
DOUGH FORMING MACHINE
Filed Sept. 8, 1959 2 Sheets-Sheet 1
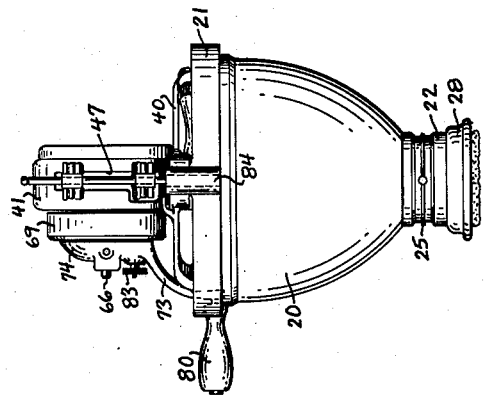
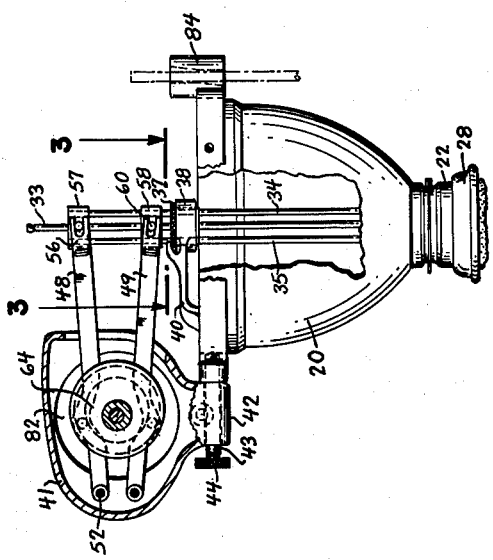
INVENTOR.
THOMAS E. BELSHAW
BY
ATTORNEYS Oct. 10, 1961   T. E. BELSHAW   3,003,439
DOUGH FORMING MACHINE
Filed Sept. 8, 1959   2 Sheets-Sheet 2
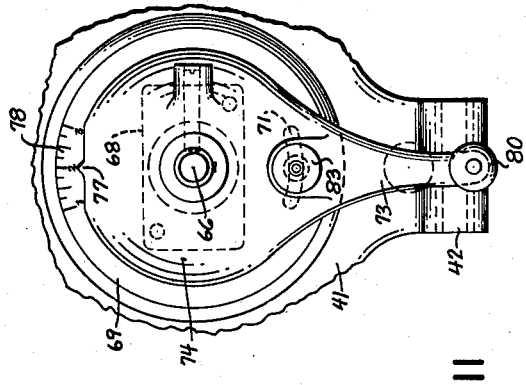
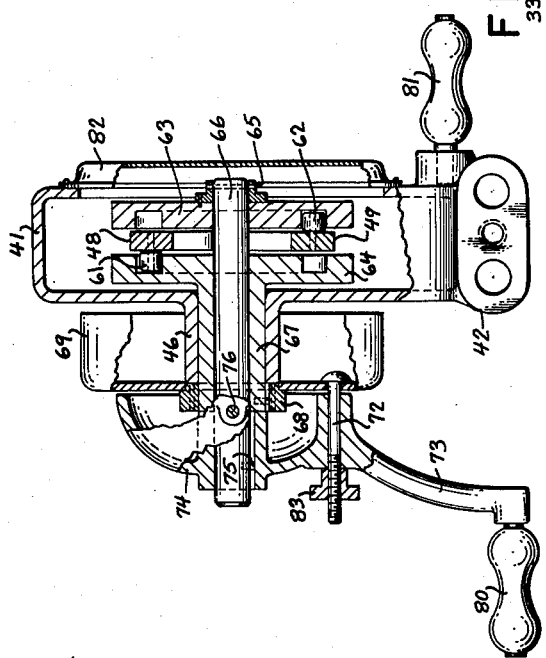
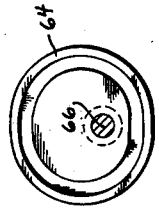
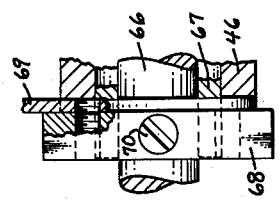
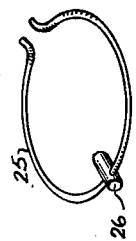
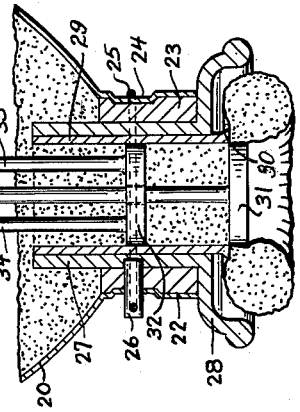
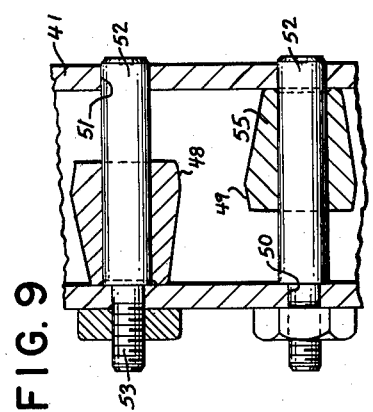
INVENTOR.
THOMAS E. BELSHAW
BY Barnes & Seed
ATTORNEYS

# United States Patent Office 3,003,439
Patented Oct. 10, 1961

3,003,439
DOUGH FORMING MACHINE
Thomas E. Belshaw, 1772 22nd Ave. S., Seattle, Wash.
Filed Sept. 8, 1959, Ser. No. 838,552
8 Claims. (Cl. 107—14)

The present invention relates to improvements in dough forming machines of the general type shown in United States Patent No. 1,738,033, and namely one in which a charge of dough is drawn from a hopper into a cylinder responsive to the downstroke of a forming piston, is extruded between the forming piston and the discharge end of the cylinder by the action of the plunger, and is cut off in doughnut ring form during the return stroke of the forming piston.

One of the principal objects of the invention is to provide an arrangement whereby various sizes of forming pistons can be conveniently employed with a given hopper assembly to vary the hole size of the doughnuts. Ancillary to this object is the aim to provide simple means for sealing against air leakage into the bottom of the hopper during the down or suction stroke of the forming piston.

A further object is to provide an improved mounting arrangement whereby the drive mechanism for the plunger and forming piston is carried by the hopper.

Still another object is the providing of a simplified driving and stroke adjusting mechanism for the plunger and forming piston.

In carrying out the above and other objects the invention also aims to provide a device which can be readily cleaned and maintained in a sanitary condition.

With yet additional objects and advantages in view which, with the foregoing, will appear and be understood in the course of the following description and claims, the invention consists in the novel construction and in the adaptation and combination of parts hereinafter described and claimed.

In the accompanying drawings:

FIG. 1 is a side elevational view of my dough forming machine with part of the hopper and cam case broken away.

FIG. 2 is a front elevational view of the machine.

FIG. 3 is a fragmentary horizontal sectional view to an enlarged scale taken along the line 3—3 of FIG. 1.

FIG. 4 is a detail fragmentary perspective view, partly exploded, showing the mounting arrangement for the cam case (shown in phantom) on the hopper mounting ring.

FIG. 5 is an enlarged transverse vertical sectional view through the cam drive assembly and looking rearwardly toward the root ends of the cam levers.

FIG. 6 is a fragmentary side elevational view of the cam case assembly as seen from the right when facing forwardly toward the hopper.

FIG. 7 is a detail elevational view of the grooved working face of one of the cams.

FIG. 8 is a detail side elevational view of the dial hub and related parts.

FIG. 9 is a detail vertical sectional view of the pivoted root ends of the cam levers.

FIG. 10 is a detail perspective view of the snap-ring; and

FIG. 11 is an enlarged vertical sectional view showing the lower end portion of the hopper assembly at the time of dough ring cut-off.

Referring more particularly to the drawings it is seen that a dough hopper 20 is provided having a mounting ring 21 secured at the top and a cylindrical extension 22 at the bottom. The latter is pressed over an externally grooved bushing 23 thereby forming a retaining groove 24 for a removable snap-ring 25. This ring is threaded through a lock pin 26 which passes through registering holes in the extension 22 and bushing 23 to interfit with a cylindrical neck 27 projecting from the top of an upwardly dished guard 28. Press fitted in the neck 27 is a bushing 29 which projects downwardly to terminate in a flared cut-off portion 30 which is skirted by the guard to coact with a forming piston 31.

A rod 33 carries the forming piston 31 and passes upwardly through a plunger 32 which in turn is mounted on a pair of rods 34—35. The three rods 33, 34 and 35 continue through the hopper and are slidably received by a round bearing block 36, provided with a rim flange 37. To support the bearing block a hub 38 is provided having a longitudinal access slot 39 to its bore made wider than the diameter of the rods 33—35. Radiating as integral supports from this hub 38 to the ring 21 is a pair of spoke arms 40.

An oblong cam case 41 has a base 42 also supported by the ring 21, but made detachable by a pair of dowels 43 projecting outwardly into the base from a tangential mounting face 45 and by a knurl-headed lock bolt 44 passing through the base between the dowels and into a mating threaded bore in the mounting face. Above its base the case 41 is hollow and has an assembly access opening at one side, a boss extension 46 at the other side, and a vertical slot 47 for cam levers 48—49 at its inner end facing the center axis of the hopper. Adjacent its outer end the cam case has respective pairs of registering openings 50—50 and 51—51 in its side faces, the first pair being of smaller diameter than the second. As shown in FIG. 9 these case openings receive necked pivot pins 52 which shoulder against the rim of the smaller openings 50 and have their necks 53 threaded to receive nuts 54 while their other ends project through the larger openings 51 and are slotted to receive a screw driver. The levers 48—49 have lateral terminal bosses 55 at one end for the pivot pins 52 and have their other ends forked at 56 to straddle blocks 57—58 which are rigidly mounted, respectively, on the upper ends of the plunger rods 34—35 and centrally of piston rod 33. Block 57 has a center bore for slidably receiving the piston rod 33 and block 58 has vertical end bores through which the plunger rods 34—35 operate. It will be noted that the individual forks 56 of the cam levers are in turn bifurcated to interfit with pins 60 projecting laterally from the blocks 58—59.

Continuing to the operation of the cam levers, such have opposite vertical bends from which project opposite journaled rollers 61—62 for riding in the opposed grooves of cams 63—64, hereinafter respectively designated as the shaft cam and the sleeve cam. The first of these is pinned at 65 to a shaft 66 which receives a sleeve extension 67 of the other cam 64, such extension in turn being journaled in the boss extension 46 of the case. A generally rectangular dial hub 68 is screw mounted near diagonally opposite corners to the front face of a rearwardly dished dial plate 69 and is keyed on a free end portion of the sleeve extension 67 which projects beyond the cam case. A set screw 70 is threaded longitudinally of the dial hub to seat against the sleeve extension. Thus it is seen that the dial plate 69, dial hub 68, and sleeve cam 64 are tied together for unitary turning action.

It will be noted that the dial plate 69 has an arcuate slot 71 for an adjusting bolt 72 carried by a crank 73 whose hub 74 is keyed to the shaft 66 at 75 and is locked thereto by a set screw 76. The crank hub 74 is given a forwardly dished effect formed with a pointer 77 at the rim opposite the crank arm for registering with a scale 78 on the dial plate. Handles 80—81 are mounted on the crank 73 and the opposite side of the cam case, and the case access opening is closed after assembly of the device by a cover 82. A knurled nut 83 is provided on the bolt 72 for locking the dial plate 69 to the crank 73 after adjustment of the cams 63—64, such being effected merely by turning the crank while restraining the dial plate. A boss 84 is provided on the mounting ring 21 opposite from the cam case so that the assembly may be readily mounted on a swing arm for handling ease.

The rim flange 37 of the bearing block is provided with a cutout portion 85 which is in the diametrical alinement of the holes in the bearing block for the rods 33—35. For functioning with this cutout one of the spoke arms 40 is formed with a lug having an overhanging lip 86 directed toward the hub 38. This lip 86 projects closer to the center of the hub than the radius of the rim flange 37 but less than the cutout 85 in the latter. To install the plunger and piston rod assembly on the hopper the forming piston 31 and plunger are lowered into the hopper to a level lower than the hub 38 and their rods 33—35 are moved sideways through the hub's access slot 39 while the bearing block 36 is held above the hub. Next the assembly is turned to aline the flange cutout 85 directly over the lug lip 86 so that the bearing block can be lowered thereby to seat by its flange 37 on the hub. Finally the assembly is turned back so that the rods are alined with the access slot 39 and this action moves the flange 37 beneath the lip 86 to lock the bearing block in position. Assembly of the machine is completed by sliding the cam case and related driving mechanism onto the dowels while interfitting the forked ends of the cam levers over the blocks 57—58 and related pins 60, and then screwing the bolt 44 into the mounting ring 21.

The machine is operated merely by turning the crank 73 after filling the hopper with dough. At the start of each cycle of the machine the forming piston enters the guard bushing 29 and as it continues toward the discharge end thereof dough is drawn out of the hopper. During this suction stroke the ring of dough surrounding the upper projecting portion of the guard neck 27 prevents air from being drawn into the hopper from between the guard and the bushing 23. The forming piston then leaves the lower end of the bushing 29 and dough is extruded around the forming piston by the continuing down stroke of the plunger 32. The resulting ring of dough is cut off by the forming piston and cut-off portion 30 of the guard bushing during the return stroke of the piston.

Of course the size of the center hole in the formed dough ring is dependent upon the diameter of the forming piston. Accordingly, when a different hole size is desired the operator need only change the plunger and forming piston assembly and substitute a guard unit having the respective inside diameter. Removal of the guard unit is readily accomplished by merely releasing the snap-ring 25 and withdrawing the related lock pin 26. Then when the substitute unit has been inserted in the bushing 23 it is rotated until its lock pin opening is brought into registry with the lock pin whereupon the snap-ring is released to seat in the retaining groove.

It is thought that the invention will have been clearly understood from the foregoing detailed description. Changes within the spirit of my teachings may be resorted to without departing from the invention and it is accordingly my intention that the hereto annexed claims be given a scope in their construction fully commensurate with the broadest interpretation to which the employed language admits.

What I claim is:

1. In a dough forming machine, a hopper with a cylindrical extension, a mounting ring on said hopper, a hub carried by said ring, said hub having a through bore centered over said extension and a longitudinal access slot into said bore, a bearing block removably interfitting with said hub, dough forming means including a rod slidably extending through said bearing block and bore and having a diameter less than the width of said access slot, and drive means removably carried by said mounting ring and operatively associated with said rod by a detachable connection, whereby said rod and bearing block can be detached from said hopper assembly after removal of said drive means by releasing said bearing block from its interfit with said hub and then moving said rod sideways out of said hub bore through said access slot.

2. In a dough forming machine, a hopper with a cylindrical extension, a spoke arm carried by said hopper, a hub carried by said arm, said hub having a through bore centered over said extension and a longitudinal access slot into said bore, a bearing block interfitting with said bore and having a circumferential flange seated on said hub, dough forming means including a rod slidably extending through said bearing block and having a diameter less than said access slot, and hold-down means carried by said arm and operatively overlying said flange of the bearing block for locking the bearing block to said hub, said flange having a cut-away portion whereby said bearing block can be turned to an unlocked position wherein its flange is free of said hold-down means and then lifted from said hub whereupon said rod can be moved sideways out of said hub bore through said access slot.

3. In a dough forming machine, a hopper with a cylindrical extension, a spoke arm carried by said hopper, a hub carried by said arm, said hub having a through bore centered over said extension and a longitudinal access slot into said bore, a bearing block interfitting with said bore and having a circumferential flange seated on said hub, dough forming means including three rods slidably extending through said bearing block in diametrically alined holes and each having a diameter less than said access slot, and hold-down means carried by said arm at a position out of diametric alinement with said access slot and operatively overlying said flange of the bearing block for locking the bearing block to said hub, said flange having a cut-away portion alined with said holes for the rods whereby said bearing block can be turned to an unlocked position wherein its flange is free of said hold-down means and then lifted from said hub whereupon said bearing block can be returned above the hub into correspondence with its locked position so that said rods can then be moved sideways out of said hub bore through said access slot.

4. The structure of claim 3 in which a cam case is detachably mounted on said hopper in radial alinement with said access slot of the hub and for removal in a direction radial of the hopper, and a cam drive in said case including cam levers extending from the case radially of the hopper and having operative detachable driving connections with said rods, said cam levers being disconnected from the rods responsive to detachment of said cam case from the hopper.

5. In a dough forming machine, a hopper with a cylindrical extension at the bottom, a removable sleeve mounted in said extension, a removable pin extending through said extension into said sleeve, snap-on means carrying said pin and gripping said extension, a mounting ring on the top of said hopper, a hub carried by said ring and having a through bore centered over said sleeve with a longitudinal access slot, a plunger and forming piston assembly operatively associated with said sleeve and including rods extending through said bore, each of said rods being smaller in diameter than the width of said access slot, a bearing block slidably receiving said rods and detachably seated in said hub, and drive means for said plunger and forming piston assembly detachably mounted on said ring and detachably operatively interconnected to said rods.

6. In a dough forming machine, a hopper assembly with a cylindrical extension at the bottom, a removable sleeve mounted in said extension, locking means for said sleeve operatively associated with said hopper assembly, a hub presented by said hopper assembly and centered above said sleeve, a detachable plunger and forming piston assembly operatively associated with said sleeve and detachably extending through said hub, and drive means detachably mounted on said hopper assembly and detachably operatively associated with said plunger and forming piston assembly above said hub.

7. The structure of claim 6 in which bearing means for said plunger and forming piston assembly detachably interfits with said hub.

8. The structure of claim 6 in which bearing means for said plunger and forming piston assembly seats on said hub and is operatively associated with releasable hold-down means carried by the hopper assembly.

References Cited in the file of this patent
UNITED STATES PATENTS

| | | |
|---|---|---|
| 349,364 | Roots | Sept. 21, 1886 |
| 1,033,828 | Risser et al. | July 30, 1912 |
| 1,191,955 | Ellison | July 25, 1916 |
| 1,225,419 | Donahue | May 8, 1917 |
| 1,386,026 | Pribil | Aug. 2, 1921 |
| 1,811,564 | Schoel | June 23, 1931 |
| 1,856,511 | Schoel | May 3, 1932 |
| 1,866,061 | Schoel | July 5, 1932 |
| 1,867,307 | Carpenter | July 12, 1932 |
| 1,870,654 | Schoel | Aug. 9, 1932 |